United States Patent
Oak et al.

(10) Patent No.: US 11,962,661 B1
(45) Date of Patent: Apr. 16, 2024

(54) DETECTING ABUSIVE COLLABORATIVE ACTIVITY USING A GRAPH NEURAL NETWORK

(71) Applicant: Microsoft Technology Licensing, LLC, Redmond, WA (US)

(72) Inventors: Rajvardhan Virendra Oak, Seattle, WA (US); Karan Khanna, San Mateo, CA (US); Vacha Rajendra Dave, Campbell, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 18/072,754

(22) Filed: Dec. 1, 2022

(51) Int. Cl.
*H04L 67/50* (2022.01)
*G06F 18/2413* (2023.01)
*G06N 3/08* (2023.01)

(52) U.S. Cl.
CPC ........ *H04L 67/535* (2022.05); *G06F 18/2413* (2023.01); *G06N 3/08* (2013.01)

(58) Field of Classification Search
CPC ...... H04L 67/535; G06F 18/2413; G06N 3/08
See application file for complete search history.

(56) References Cited

U.S. PATENT DOCUMENTS

| | | |
|---|---|---|
| 8,762,298 B1 | 6/2014 | Ranjan et al. |
| 2021/0319324 A1* | 10/2021 | Mueller ................. G06N 3/04 |

OTHER PUBLICATIONS

Ma, et al., "A Comprehensive Survey on Graph Anomaly Detection with Deep Learning," arXiv, Cornell University, arXiv:2106.07178v5 [cs.LG], Apr. 20, 2022, 32 pages.
Jost, Zak "Graph Convolutional Networks (GCNs) made simple," available at https://www.youtube.com/watch?v=2KRAOZIULzw, YouTube channel WelcomeAIOverlords, screenshot at time 8:01, May 18, 2020, one page.
Wu, et al., "A Comprehensive Survey on Graph Neural Networks," arXiv, Cornell University, arXiv:1901.00596v4 [cs.LG], Dec. 4, 2019, 22 pages.
Zhou, et al., "Graph neural networks: A review of methods and applications," in AI Open, No. 1, 2020, pp. 57-81.
"Graph neural network," available at https://en.wikipedia.org/wiki/Graph_neural_network, Wikipedia article, accessed on Oct. 23, 2022, 9 pages.

(Continued)

*Primary Examiner* — Minh Chau Nguyen

(57) ABSTRACT

A technique uses a graph neural network (GNN) to determine whether a particular entity under consideration is engaging in abusive network-related activity over a computing network in collaboration with other entities. In some applications, the particular entity is part of a bot attack aimed at fraudulently engaging with advertisements. The technique trains the GNN by performing machine learning on a training set that includes a plurality of nodes, edges, and node labels. In forming the training set, the technique associates a feature set with each node in the training set that describes the network activity exhibited by that node's entity. The technique then connects each pair of nodes in the training set with an edge if the feature sets of the pair satisfy a prescribed test for similarity. The technique assigns labels to at least some nodes to convey whether the nodes are associated abusive network-related activity.

20 Claims, 7 Drawing Sheets

(56) References Cited

OTHER PUBLICATIONS

Zhao, et al., "Multi-attributed heterogeneous graph convolutional network for bot detection," in Information Sciences, vol. 537, Oct. 2020 (available on-line Jun. 2, 2020), pp. 380-393.
PCT Search Report and Written Opinion for PCT Application No. PCT/US2023/035552 (which claims priority to U.S. Appl. No. 18/072,754), mailing date, Feb. 21, 2024, 14 pages.
Zhao, et al., "Multi-attributed heterogeneous graph convolutional network for bot detection Author links open overlay panel," in Information Sciences, vol. 537, Oct. 2020 (available on-line Jun. 2, 2020), pp. 380-393.
PCT Search Report and Written Opinion for PCT/US2023/035552, mailing date, Feb. 21, 2024, 14 pages.

* cited by examiner

OVERVIEW OF OPERATION OF THE TRAINING FRAMEWORK, 602

IDENTIFY A PLURALITY OF ENTITIES THAT INTERACT WITH A COMPUTING NETWORK, EACH OF WHICH IS DETERMINED TO EXHIBIT A PRESCRIBED AMOUNT OF THE NETWORK ACTIVITY.
604

ASSOCIATE RESPECTIVE NODES WITH THE ENTITIES.
606

IDENTIFY RESPECTIVE FEATURE SETS FOR THE PLURALITY OF ENTITIES, EACH FEATURE SET INCLUDING FEATURES THAT DESCRIBE NETWORK ACTIVITY EXHIBITED BY AN ASSOCIATED ENTITY.
608

IDENTIFY A PLURALITY OF EDGES, EACH EDGE IN THE PLURALITY OF EDGES CONNECTING TWO ENTITIES IN THE PLURALITY OF ENTITIES HAVING FEATURE SETS THAT SATISFY A PRESCRIBED TEST FOR SIMILARITY.
610

LABEL AT LEAST SOME OF THE ENTITIES WITH LABELS, EACH LABEL INDICATING WHETHER A CORRESPONDING ENTITY IS A KIND OF ENTITY THAT ENGAGES IN ABUSIVE NETWORK-RELATED ACTIVITY IN COLLABORATION WITH OTHER ENTITIES, WITH RESPECT TO A GIVEN STANDARD THAT DEFINES WHAT CONSTITUTES ABUSIVE NETWORK-RELATED ACTIVITY, THE NODES, EDGES, AND LABELS DEFINING A TRAINING SET.
612

TRAIN THE GRAPH NEURAL NETWORK BASED ON THE TRAINING SET, TO PROVIDE A TRAINED GRAPH NEURAL NETWORK.
614

CONFIGURE AN ABUSE CONTROL SYSTEM USING THE TRAINED GRAPH NEURAL NETWORK TO DETECT AND ACT ON ABUSIVE NETWORK-RELATED ACTIVITY IN THE COMPUTING NETWORK.
616

DETECTING ABUSIVE COLLABORATIVE ACTIVITY USING A GRAPH NEURAL NETWORK

BACKGROUND

Traditional systems for detecting malware-infected entities operate by comparing the signatures of the entities with the signatures of known malicious actors. While useful, these systems do not adequately detect many types of abusive conduct that occurs over a computing network.

SUMMARY

A technique is described herein for detecting whether a particular entity under consideration is engaging in abusive network-related activity over a computing network in collaboration with other entities. The technique performs this task using a graph neural network (GNN). What constitutes abuse is defined in different ways by different applications. In some applications, the particular entity is part of a group of entities engaging in a bot attack over the computing network. In some examples, the bot attack is specifically aimed at engaging in fraudulent engagement with advertisements.

In some implementations, the technique trains the GNN by performing machine learning on a training set that includes a plurality of nodes, edges, and node labels. In forming the training set, the technique creates nodes for entities that engage in a prescribed amount of network activity. The technique then associates a feature set with each node in the training set that describes the network activity exhibited by that node's corresponding entity. The technique connects a pair of nodes in the training set with an edge if the feature sets of those nodes satisfy a prescribed test for similarity, described below. The technique assigns labels to at least some of the nodes that convey whether the nodes are associated with abusive network-related activity.

Different applications use different criteria in defining what constitutes an entity. For instance, different applications associate entities with different device identifiers, different network address identifiers (e.g., IP addresses), different network cookie identifiers, etc. or any combination thereof.

In some implementations, a feature set associated with a given entity describes characteristics of the entity's engagement with content that is deliverable over the computing network via websites. In some examples, the content is advertisements and the websites are hosted by content publishers.

In some implementations, a feature set associated with a given entity includes at least some features that describe a distribution of network activity by the given entity, with respect to a particular category of activity. For example, some features describe the level of the given entity's engagement with different websites.

In some implementations, the technique determines that a first node (associated with a first entity) is connected to a second node (associated with a second entity) when a first feature vector that describes a distribution of network activity by the first entity and a second feature vector that describes a distribution of network activity of the second entity satisfy the prescribed test for similarity.

The above-summarized technology is described herein as manifested in various types of systems, devices, components, methods, computer-readable storage media, data structures, graph user interface presentations, articles of manufacture, and so on.

This Summary is provided to introduce a selection of concepts in a simplified form; these concepts are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

FIG. 6 shows a process that describes one manner of operation of the training framework of FIG. 1.

The same numbers are used throughout the disclosure and figures to reference like components and features. Series 100 numbers refer to features originally found in FIG. 1, series 200 numbers refer to features originally found in FIG. 2, series 300 numbers refer to features originally found in FIG. 3, and so on.

DETAILED DESCRIPTION

This disclosure is organized as follows. Section A describes an illustrative computing system for detecting and controlling abusive network activity. Section B sets forth illustrative methods that explain the operation of the computing system of Section A. Section C describes illustrative computing functionality that, in some implementations, is used to implement any aspect of the features described in Sections A and B.

A. Illustrative Computing System

Figure 1:
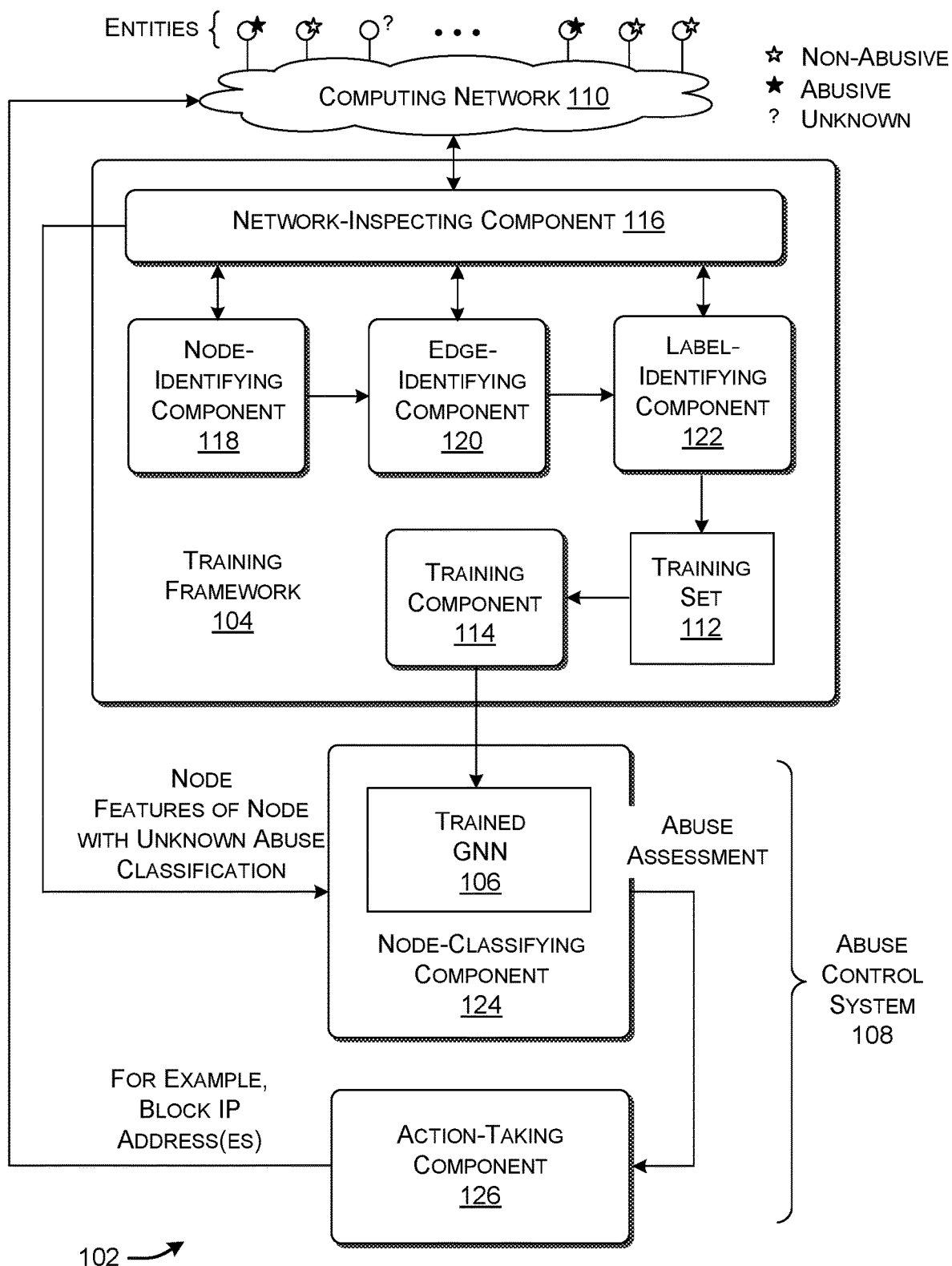
FIG. 1 shows a computing system having a training framework for training a graph neural network (GNN), and an abuse control system that uses the GNN to control abusive network-related activity over a computing network.

FIG. 1 shows a computing system 102 having a training framework 104 for training a graph neural network (GNN) 106, and an abuse control system 108 that uses the GNN 106 to control abusive network-related activity over a computing network 110. In some implementations, the computing network 110 is a wide-area network, such as the Internet. Different applications define what "abusive network-related activity" constitutes with respect to any predetermined standard specified by a service provider, network administrator, standards agency, user group, etc. Generally, a standard defines: (a) what kind of network transactions are evidence of abusive conduct; and (b) the quantity of that behavior that constitutes abuse. In some examples, abusive network-related activity is activity that is associated with a bot attack.

Here, plural entities engage in coordinated network-related activity aimed at achieving an end that is deemed malicious or otherwise disallowed or disfavored, with respect to the predetermined standard.

In some examples, for instance, plural entities involved in a bot attack are configured to fraudulently click on advertisements with the goal of disrupting the operation of an advertising platform. This type of network-related activity corrupts the statistics by which advertisers gauge the success of their advertising campaign. As a further consequence, this type of attack sometimes results in financial damage to advertisers and other entities in the advertising community. It further disrupts the end users' consumption of online resources.

More generally, any service that invites participation by users of a wide-area network is subject to similar attacks. Other examples of bot attacks create fraudulent votes (e.g., "likes"), comments, subscribers, registrations, accounts, contacts (e.g., "friends"), news article selections, etc., or any combination thereof. The objective of bot attacks is likewise diverse. In some cases, bot attacks are aimed at simply swaying public opinion, e.g., by actively shaping a narrative regarding an event through artificial clicks or "likes" on news articles or social network postings.

Different bot campaigns achieve coordinated behavior in different respective ways. In a traditional bot attack, a source entity distributes a malicious program to a plurality of computing devices e.g., via Email messages sent to the computing devices. A computing device, once infected with the malicious program, begins its participation in the bot attack. In some cases, the malicious program may direct the infected computing device to click on advertisements in one or more websites on a predetermined schedule and/or in response to other cues. Generally, a bot refers to a program that runs on a computing network, with the objective of impersonating actions that humans might perform over the computing network.

Note, however, that the computing system 102 is agnostic with respect to how bot campaigns technically achieve their objectives. For instance, it does not operate by directly detecting malware programs installed on user devices. Likewise, the computing system 102 is capable of detecting whether a particular entity is engaging in collaborative fraudulent activity regardless of whether the particular entity is a witting or unwitting participant in such activity.

The term "entity" as used herein refers to an actor that interacts with the GNN 106. Different applications define what constitutes an entity in different respective ways. For instance, entities may be associated with different device addresses (e.g., different media access control (MAC) addresses), different browser application identifiers, different network addresses (e.g., different Internet Protocol (IP) addresses), different user identifiers, different group identifiers, different user location identifiers, different network cookie identifiers, and so. In other cases, any entity may be defined with respect to two or more identifiers. For instance, a single entity may be defined by a combination of a particular IP address and a particular network cookie identifier. In another case, a single entity may be defined by a combination of a modem identifier and a MAC address, and so on. To facilitate explanation, assume that the different entities in the examples that follow correspond to different respective IP addresses.

The following provides a summary of the operation of the training framework 104, followed by a summary of the operation of the abuse control system 108. The training framework 104 produces a training set 112. By way of overview, a training component 114 operates on the training set 112 to produce the GNN 106. The abuse control system 108 uses the GNN 106 to control interaction by entities with the computing network 110.

More specifically, the training framework 104 includes a network-inspecting component or mechanism 116 that collects information regarding the entities which interact with the computing network 110. Consider the merely illustrative case in which a provider of a search engine or social network application implements the training framework 104, or an entity in cooperation with a search engine or social network application implements the training framework 104. This type of entity maintains a log that provides information regarding queries submitted by end users ("users"), search results and advertisements served to the users in various circumstances, and selections (e.g., "clicks") made by the users in response to submitting the input queries. In some cases, the selections reflect clicks by users on advertisements and landing pages. The network-inspecting component 116 collects and stores at least some of such network-related activity. The training framework 104 further takes proper precautions to ensure that the data collected by the network-inspecting component 116 is stripped of sensitive user content, e.g., by anonymizing the data.

As a first function, a node-identifying component 118 identifies a group of qualifying entities for inclusion in the training set 112. In some implementations, the node-identifying component 118 defines a qualifying entity as an entity that has engaged in a prescribed amount of network activity with a prescribed period of time. In some examples, the node-identifying component 118 specifically defines a qualifying entity as an entity that has: (1) made at least a prescribed number of clicks within the prescribed period of time; and (2) has engaged in network-related activity over at least a prescribed span of time. The test performed by the node-identifying component 118 produces a sparse graph, which serves as the training set 112. By operating on a sparse graph, the training component 114 reduces its use of computing resources (e.g., memory and processor resources). The test performed by the node-identifying component 118 also reduces noise in the training set 114 by eliminating low-activity entities from the training set 112, which, in turn, enables the training component 114 to produce a high-quality trained GNN 106.

As a second function, the node-identifying component 118 associates a node in the training set 112 with each qualifying entity. The node-identifying component 118 also creates a feature set for each node. The feature set includes a plurality of features that describe the network-related activity of the entity associated with the node. An illustrative composition of a feature set will be set forth below in connection with the explanation of FIGS. 4 and 5. As a preview of that later explanation, some features in a feature set describe characteristics of engagement by the particular entity with content that is deliverable over the computing network via websites hosted by the computing network. In some examples, the content corresponds to advertisements that are deliverable over the computing network by websites hosted by respective publishers.

An edge-identifying component 120 determines, for each pair of nodes in the training set 112, whether the nodes should be connected by an edge. Assume that a pair under consideration includes a first node associated with a first entity and a second node associated with a second entity. In some implementations, the edge-identifying component 120 performs this task by comparing certain features of the first node's feature set with corresponding features of the second node's feature set. The edge-identifying component 120 determines that the nodes should be connected by an edge if the features from the two feature sets satisfy a prescribed test for similarity. As will be described in greater detail below with respect to FIG. 5, in some examples, the edge-identifying component 120 specifically computes the cosine similarity between a first vector and a second vector, and then determines whether the result of this computation satisfies a prescribed threshold value. The first and second vectors express some of the features in the first and second feature sets, respectively. In addition, the edge-identifying component 120, in applying its prescribed test of similarity, relies on any other evidence to determine whether the first and second nodes under consideration are related. For example, the edge-identifying component 120 may connect the first and second nodes if their corresponding entities belong to a known group, and/or the entities are members of a single system, or and/or another service identifies these entities as related. In other words, the prescribed test for similarity is not limited to the comparison of feature sets expressed as vectors.

A label-identifying component 122 assigns labels to at least some of the nodes in the training set 112. Each label assigned to a particular node identifies whether the node is associated with abusive network-related activity. The label-identifying component 122 reaches its conclusion with respect to a particular node based on any of: a) assessments made by computer security experts and/or other bot detection services for the particular node; b) behavioral characteristics of the node, especially where such characteristics exceed prescribed threshold values; c) evidence of malware installed on the entity associated with the particular node, etc. The behavioral characteristics in factor (b) include a conversion ratio associated with the node's entity, click yield exhibited by the node's entity, etc. In addition to these considerations, in some implementations, the label-identifying component 122 only applies a label when the evidence described above has a confidence level above a prescribed environment-specific value. Some implementations place the greatest evidentiary weight on factor (a) in making this determination. In some cases, the label-identifying component 122 cannot associate a label with the node under consideration because the above tests are not satisfied. In that case, the label-identifying component 122 leaves that node unlabeled.

The training component 114 trains the GNN 106 in iterative fashion based on the training set 112. Generally, the training component 114 iteratively updates model weights of the GNN 106. At each training iteration, the training component 114 computes loss, which expresses the difference between predictions made by the GNN 106 and the ground-truth labels in the training set 112. For instance, assume that the GNN 106 predicts that a particular node under consideration is associated with abusive network-related activity. The training component 114 will adjust the model weights to reinforce this prediction if it agrees with the ground-truth label for this node, and will adjust the model weights to penalize this prediction if it differs from the ground-truth label for this node. More formally stated, in some examples, the training component 114 performs this type of training using stochastic gradient descent in combination with back propagation.

Now referring to the abuse control system 108, a node-classifying component 124 uses the GNN 106 to determine a classification result for a particular node under consideration. The classification result indicates whether the particular node is associated with abusive network-related activity, with respect to the predetermined standard of what constitutes abusive network-related activity. In some cases, a node under consideration corresponds to an entity already represented by the training set 112; this node may or may not have been assigned a preliminary label in the training set 112. In other cases, the particular node under consideration corresponds to an entity which is not represented by the training set 112. For instance, this node may correspond to an entity which only recently started engaging in activity over the computing network 110.

Figure 7:
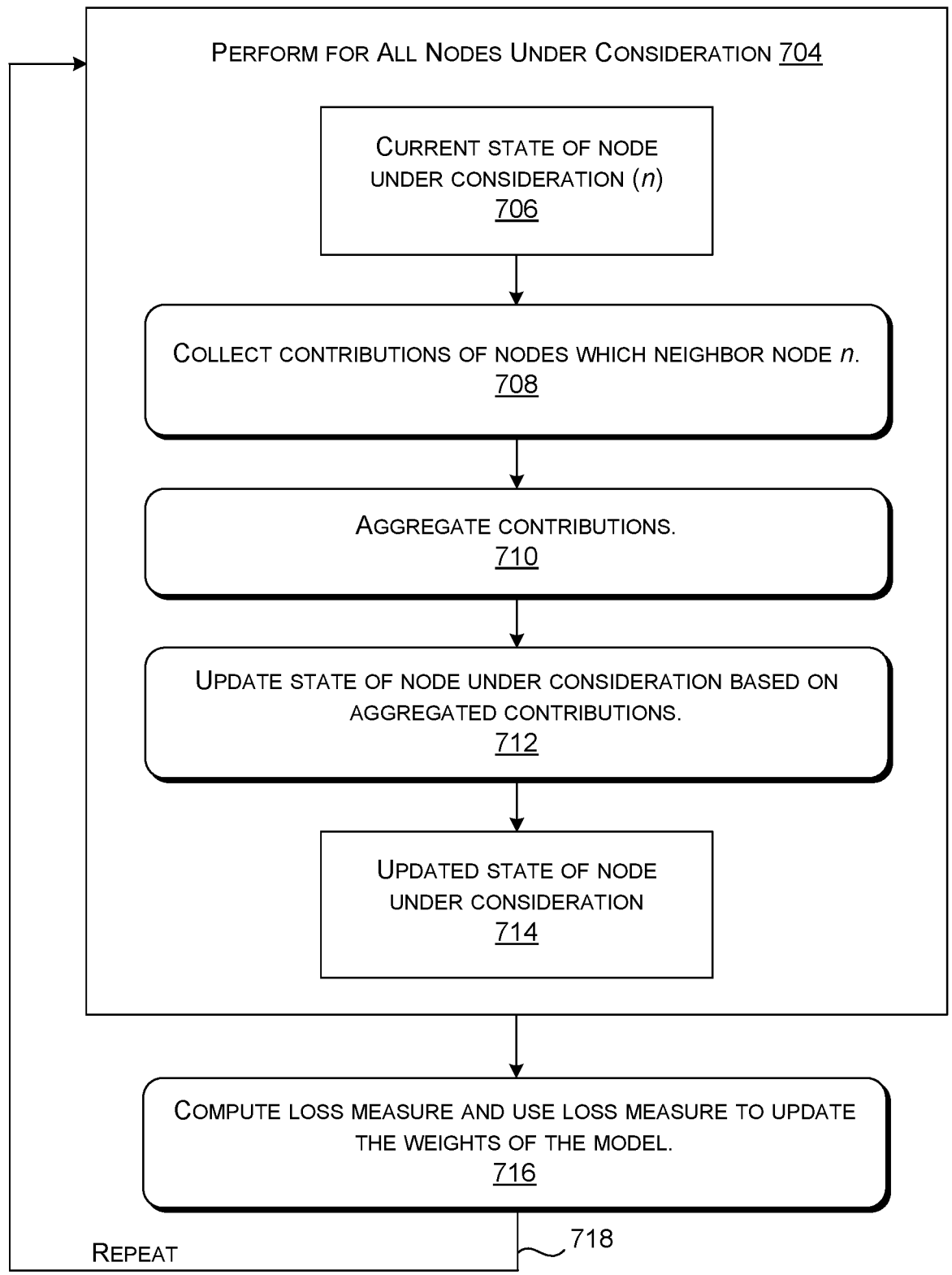
FIG. 7 shows a process for training one kind of GNN.

The node-classifying component 124 operates by mapping a feature set associated with the node under consideration to the classification result using the trained GNN 106. This operation involves any deterministic mapping governed by the particular kind of model used by the GNN 106. FIG. 7, described in turn, explains one way in which a graph neural network propagates node states within a graph to a classification result.

An action-taking component 126 performs any action based on the classification result. For example, assume that the classification result for a node under consideration indicates that the entity associated with the node is the kind of node that engages in abusive network-related activity, e.g., because it appears to be taking part in a bot attack. The action-taking component 126 may block the entity from interacting with selected services (e.g., by adding the entity to a block list), ignore or discount the clicks of the entity, and so on.

Figure 2:
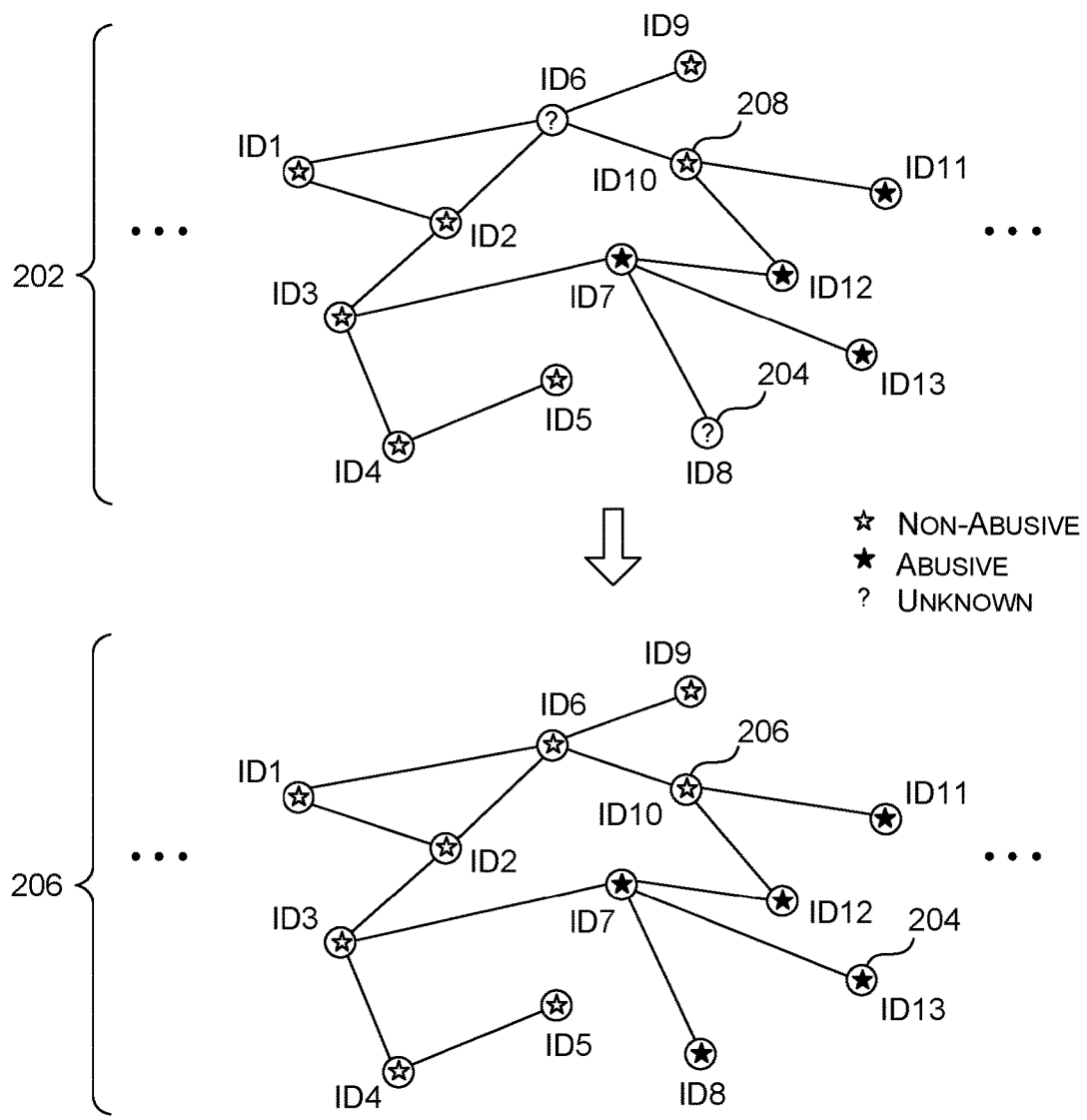
FIG. 2 shows a sample of a training set used by the training framework of FIG. 1 to train the GNN.

FIG. 2 shows a training set 202 produced by the training framework 104. The training set 202 includes a set of nodes (represented in FIG. 2 by circles) associated with entities that exhibit a prescribed amount of network-related activity. The training set 202 includes edges that connect some pairs of nodes. For each pair having a first node and a second node, an edge indicates that a feature set of the first node is sufficiently similar to a feature set of the second node, with respect to at least some of the features in the feature sets. At least some of the nodes in the training set 202 have labels. A solid black star indicates that a node's entity is associated with abusive network-related activity. A white-centered star indicates that a node's entity is not associated with abusive network-related conduct. At least some nodes (for example, node 204) have not been classified as abusive or non-abusive.

The bottom part 206 of FIG. 2 represents the outcome of the operation of the node-classifying component 124. Assume that the objective in this case is to determine the classification status of the node 204. The node-classifying component 124 uses the trained GNN 106 to map a feature set associated with the node's entity to a classification result. The classification result in this particular case indicates the node's entity is associated with abusive network-related activity.

In general, the computing system 102 provides an effective way of detecting and responding to collaborative network-related activity that is deemed abusive. A traditional malware detection engine, by contrast, operates by comparing an entity's signature to the signature of known malicious entities. A traditional malware detection engine may be successful in detecting those occasions in which the entity is infected with a malicious bot program having a known signature. But it will not be successful in detecting those cases in which an entity's abusive conduct is only made clear by considering the behavioral relations among different entities the computing network 220. The computing system 102, through its use of the GNN 106, is effective at exposing this type of abusive conduct.

Figure 3:
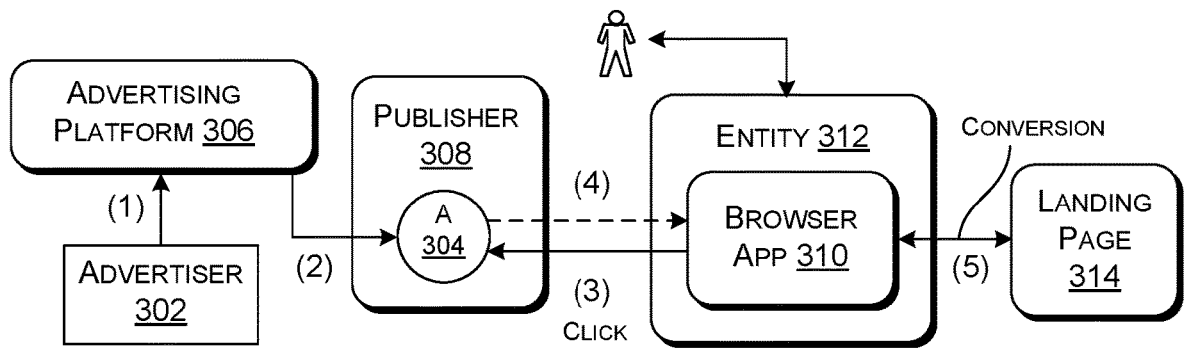
FIG. 3 shows components associated with one application of the computing system of FIG. 1.

FIG. 3 shows the application of the computing system 102 to an advertising-related platform. First consider activity that is considered non-abusive in nature. Assume that an advertiser 302 first creates an advertisement 304. An advertising platform 306 receives the advertisement 304 from an advertiser (operation 1) or creates the advertisement on behalf of the advertiser 302. The advertising platform 306 then presents the advertisement 304 on a publisher's website 308 (operation 2) in response to any environment-specific triggering event. A browser application 310 running a computing device, associated with an entity 312, clicks on the advertisement 304 on the website 308 (operation 3). In some cases, this action may direct to the entity 312 (operation 4) to a landing page 314 (operation 5), corresponding to another website hosted by the advertiser. For example, assume that the advertisement 304 provides an offer relating to a particular product or service. The landing page 314 is a website that provides additional information regarding the product or service, and potentially allows the user to purchase the product or service. Although not shown in FIG. 3, the advertising platform 306 collection information regarding the entity's actions to update statistics by which the advertiser 302 monitors the success of its advertising campaign.

An abusive scenario attempts to mimic the above interaction. For instance, a malicious program may click on the advertisement 304 without knowledge of a user associated with the entity 310. In some cases, the malicious program may click on the advertisement 304 at a high frequency or at a timing that reflects some other anomalous pattern (with respect to the manner in which humans typically click on advertisements). In other cases, the malicious activity of a program running on the entity 312 is only evident when considering the operation of plural malicious programs operating in collaboration.

Figure 4:
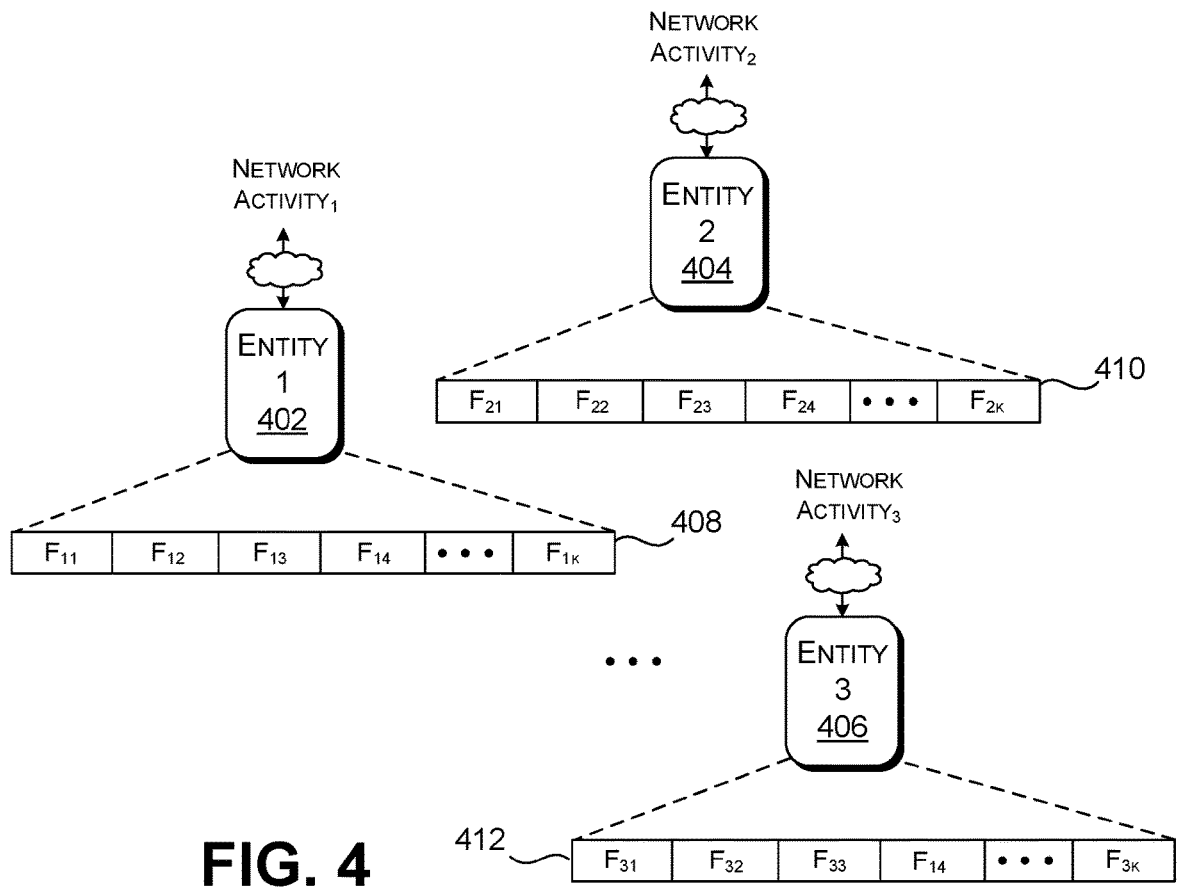
FIG. 4 shows feature sets associated with respective entities in the training set of FIG. 2.

FIG. 4 shows feature sets created by the node-identifying component 118 of FIG. 1 for three nodes associated with three representative entities (402, 404, 406). That is, a feature set 408 is associated with entity 402, a feature set 410 is associated with entity 404, and a feature set 412 is associated with entity 406. The node-identifying component 118 generates the feature sets based on data collected from the network-inspecting component 116.

A non-exhaustive and illustrative set of features includes any of the following features. The term "click" and its variants below encompasses the case in which an entity clicks on an item with a mouse device or finger/stylus touch, but more generally includes any mechanism by which a user may select the item.

a) Number of Clicks. This feature describes a number of clicks an entity has made in a prescribed period of time (e.g., the last seven days).

b) Conversion Rate. This feature describes the percentage of conversions executed by the entity, relative to the number of opportunities given to the entity to execute a conversion. For example, assume that a conversion occurs when a user purchases a product associated with an advertisement. The conversion rate describes how many times a user made purchases of one or more specified products after being presented with advertisements for the product(s), within a prescribed period of time. Other advertising campaigns define a conversion as a subscription, registration, completed survey, etc.

c) Variance in Time-to-Click (TTC). Time-to-click generally describes an amount of time between presentation of an advertisement and the entity clicking on the advertisement. Variance in TTC generally describes the statistical variance of these TTC measures within a prescribed period of time. Standard deviation (a) is one possible expression of variance.

d) Variance in Click Minute. This feature describes statistical variance between successive clicks on advertisements, with respect to minute-sized gradations in time. This feature exposes patterns of clicking behavior that are contrived and may not match the typical behavior of users who clicks on advertisements. As such, in some cases, a "real" entity will exhibit greater variance in click minutes compared to a malicious entity.

e) Variance in Click Hour. This feature describes statistical variance between successive clicks on advertisements, with respect to hour-sized gradations in time.

f) Variance in Mean Query Entropy. This feature describes the variation in queries that ultimately lead to clicks on advertisements. In some cases, a malicious entity will draw from a limited set of queries in its fraudulent activity. A "real" entity in this case will exhibit greater variation in its query selection compared to a malicious entity.

g) Median or Mean Daily Active Hours. A single active hour measure reflects how long a user session has lasted. This feature describes the median or mean of plural such individual measures within a prescribed period of time (e.g., the last seven days).

h) Distribution of Clicks over Publishers. This part of a feature set refers to a group of individual features, each of which describes an entity's engagement with a particular website in a defined group of websites. For example, assume that the group of websites are hosted by popular publishers of content on which advertisements are posted. Further assume that an entity makes 500 clicks over all of websites hosted by these publishers in the last seven days. A first feature of this group identifies the normalized number of times (clicks_pub1/500) that the entity clicked on the first publisher, a second feature of this group identifies a normalized number of times (clicks_pub2/500) that the entity clicked on the second publisher, and so on.

i) Distribution of Clicks over Advertisers. This component of a feature set refers to a group of individual features, each of which quantifies an entity's engagement with advertisements by a particular advertiser, the particular advertiser being one of a predefined list of advertisers. In other words, this group of features is similar to the feature (h), but the focus of interest in this case is advertisers rather than publishers.

j) Distribution of Clicks over TTC. This component of a feature set refers to a set of individual features, each of which describes a time-to-click (TTC) measure with respect to particular span of time. For example, a first feature describes a normalized measure of the number of times that the user clicked on advertisements within the first five seconds after being presented with the advertisements, a second feature describes a normalized measure of the number of times that that the user clicked on advertisements within five seconds to ten seconds after being served the advertisements, a third feature describes a normalized measure of the number of times that user clicked on advertisements within ten to fifteen seconds after being served the advertisements, and so on.

To repeat, other implementations may introduce additional features not mentioned in the list above. Alternatively, or in addition, other implementations may omit one or more features mentioned in the list above.

Figure 5:
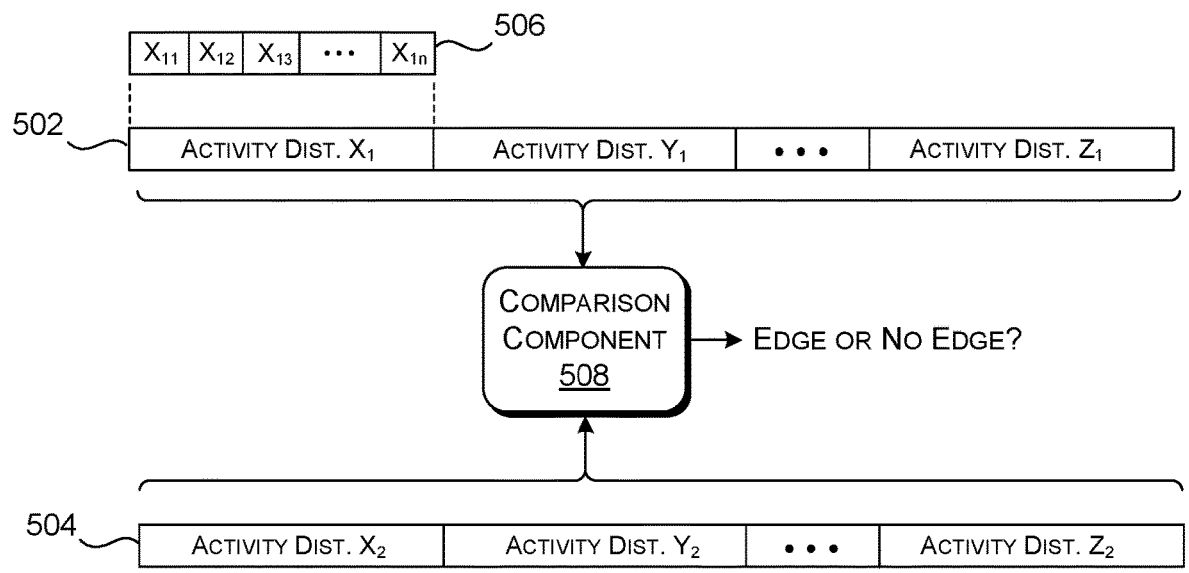
FIG. 5 shows functionality for determining whether any two nodes in the training set of FIG. 2 should be connected by an edge.

FIG. 5 shows an example of processing performed by the edge-identifying component 120. Assume that feature vector 502 represents selected features extracted from a first entity's feature set, and feature vector 504 represents selected features extracted from a second entity's feature set. In the example of FIG. 5, the first vector 502 specifically includes at least three feature groups that describe the behavior of the first entity with respect to three respective distributions. For example, assume that the first feature group $X_1$ 506 corresponds to the above-mentioned feature (h), corresponding to clicks over publishers. FIG. 5 shows this feature group $X_1$ 506 in expanded form. The second feature group $Y_1$ corresponds to the above-mentioned feature (i), corresponding to clicks over advertisers. The third feature group $Z_1$ corresponds to above-mentioned feature (j), corresponding to clicks over TTC (time-to-click). Similarly, the second vector 504 includes at least three complementary groups of feature groups ($X_2$, $Y_2$, and $Z_2$) that describe the behavior of the second entity with respect to above-identified three distributions, e.g., corresponding to the above mentioned features (h), (i), and (j). Although not represented by FIG. 5, the feature vectors (502, 504) may also include features that describe single-valued information (e.g., corresponding to any of features (a) through (g) described above).

A comparison component 508 measures the similarity between the first vector 502 and the second vector 504 using any distance metric, such as cosine similarity, Euclidean distance, etc. The comparison component 508 concludes that the two entities under consideration are connected if the result of this similarity measurement is above a prescribed threshold value. Otherwise, the two entities are not considered to be connected. The edge-identifying component 120 produces an edge between any two nodes that are determined to be connected.

B. Illustrative Processes

Figure 8:
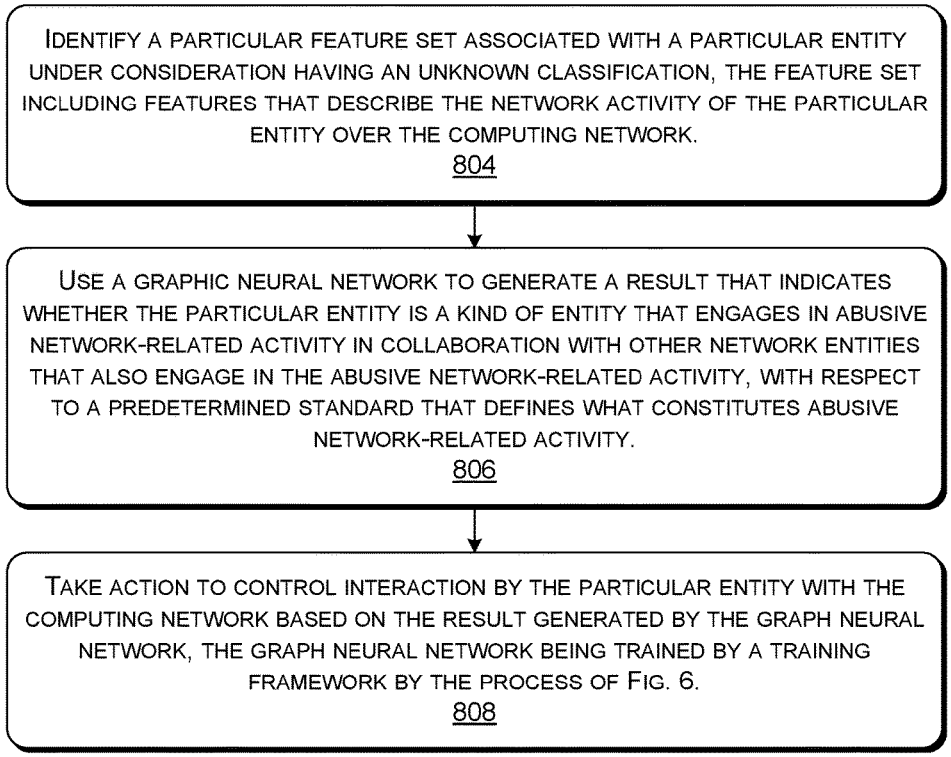
FIG. 8 shows a process that describes one manner of operation of the abuse control system of FIG. 1.

FIG. 6-8 show illustrative processes that explain the operation of the computing system 102 of Section A in flowchart form. Since the principles underlying the operation of the computing system 102 have already been described in Section A, certain operations will be addressed in summary fashion in this section. Each flowchart is expressed as a series of operations performed in a particular order. But the order of these operations is merely representative, and varies in other implementations. Further, any two or more operations described below is capable of being performed in a parallel manner. In one implementation, the blocks shown in the flowcharts that pertain to processing-related functions are implemented by the hardware logic circuitry described in Section C, which, in turn, includes one or more processors and/or other logic units that include a task-specific collection of logic gates.

Starting with FIG. 6, this figure shows a process 602 for training a graph neural network (GNN) 106 for use in controlling network activity. In block 604, the training framework 104 identifies a plurality of entities that interact with the computing network 110, each of which is determined to exhibit a prescribed amount of network activity. In block 606, the training framework 104 associates respective nodes with the entities. In block 608, the training framework 104 identifies respective feature sets for the plurality of entities, each feature set including features that describe network activity exhibited by an associated entity. In block 610, the training framework 104 identifies a plurality of edges, each edge in the plurality of edges connecting two entities in the plurality of entities having feature sets that satisfy a prescribed test for similarity. In block 612, the training framework 104 labels at least some of the entities with labels, each label indicating whether a corresponding entity is a kind of entity that engages in abusive network-related activity in collaboration with other entities. The nodes, edges, and labels define the training set 112.

In block 614, the training framework 104 trains a graph neural network (GNN) based on the training set 112, to provide the trained GNN 106. In block 616, the training framework 104 configures the abuse control system 108 using the trained GNN 106 to detect and act on abusive network-related activity in the computing network 110. Block 616 involves installing the GNN 106 in the abuse control system 108.

A variant of the process 602 shown in FIG. 2 includes: associating (per block 606) respective nodes with the entities that engage in network activity over the computing network 110; identifying (per block 608) respective feature sets for the plurality of entities, each feature set including features describing characteristics of engagement by a particular entity with content that is deliverable over the computing network 110 via websites hosted by the computing network 110; identifying (per block 610) a plurality of edges, each edge in the plurality of edges connecting two entities in the plurality of entities having feature sets that satisfy a prescribed test for similarity; labeling (per block 612) at least some of the entities with labels, each label indicating whether a corresponding entity is a bot that engages in collaborative activity over the computing network 110 with other bots, the nodes, edges, and labels defining the training set 112; and training (per block 614) a graph neural network based on the training set 112, to provide the trained GNN 106 for use by the abuse control system 108.

FIG. 7 shows a process 702 performed by the training component 114 for training the GNN 106. In particular, the process 702 corresponds to steps for training a convolutional graph neural network. However, the training component 114 is able to train any type of graph neural network. Background information on the generic topic of different types of graph neural networks is available at Wu, et al., "A Comprehensive Survey on Graph Neural Networks," arXiv, Cornell University, arXiv:1901.00596v4 [cs.LG], Dec. 4, 2019, 22 pages.

The training component 114 performs a routine 704 for all nodes in the training set 112 in parallel. FIG. 7 specifically shows the routine 704 being performed with respect to a particular node n. To be more concrete, assume that the node n corresponds the node 208 shown in FIG. 2, associated with an entity identifier ID10. At a given time, the node 208 has a current state $h_{t-1}{}^n$, 706. The subscript t−1 indicates that the state reflects the outcome of a computation made in a previous iteration, if any. Initially, the state of each node corresponds to a vector that expresses its feature set, an example of which was described in context of the explanation of FIG. 4.

In block 708, the training component 114 collects the contributions of all nodes connected to the node 208. For example, the node 208 is connected by three edges to the neighboring nodes associated with identifiers ID6, ID11, and ID12. In block 710, the training component 114 sums the current states of the three neighboring nodes and then adds the resultant sum to the current state of the node 208. Other implementations perform other types of combinations besides summation, such as multiplication, concatenation, etc. In block 712, the training component 114 then multiplies this result by machine-trained model weights W, divides the outcome by the number of states that were added together (in the example of node 208, there are four states), and transforms the result of that computation using any activation function, such as the ReLU activation function. This yields an updated state 714 for the node 208 under consideration, $h_t''$.

In block 716, the training component 114 computes a loss measure based on the current measure and adjusts the model weights of the GNN 106 on the basis of the loss measure. In the example of FIG. 2, the training component 114 computes a loss measure that measures the accuracy at which the GNN 106, in its current state of training, predicts node labels, with reference to the known ground-truth labels identified by the label-identifying component 122.

A loop 718 indicates that the entire process 702 is repeated one or more additional times. As iterations are performed, each node in the graph gains increasingly deeper knowledge regarding knowledge imparted by other nodes in the graph. The "depth" of knowledge refers to the distance between the node under consideration and the node which contributes information to the node under consideration, with respect to number of node "hops."

FIG. 8 shows a process 802 that explains one manner of operation of the abuse control system 108. In block 804, the abuse control system 108 identifies a particular feature set associated with a particular entity under consideration having an unknown classification. The feature set includes features that describe the network activity of the particular entity over the computing network 110. In block 806, the abuse control system 108 uses the GNN 106 to generate a result that indicates whether the particular entity is a kind of entity that engages in abusive network-related activity in collaboration with other network entities that also engage in the abusive network-related activity, with respect to a predetermined standard that defines what constitutes abusive network-related activity. In block 808, the abuse control system 108 takes action to control interaction by the particular entity with the computing network 110 based on the result generated by the GNN 106.

C. Representative Computing Functionality

Figure 9:
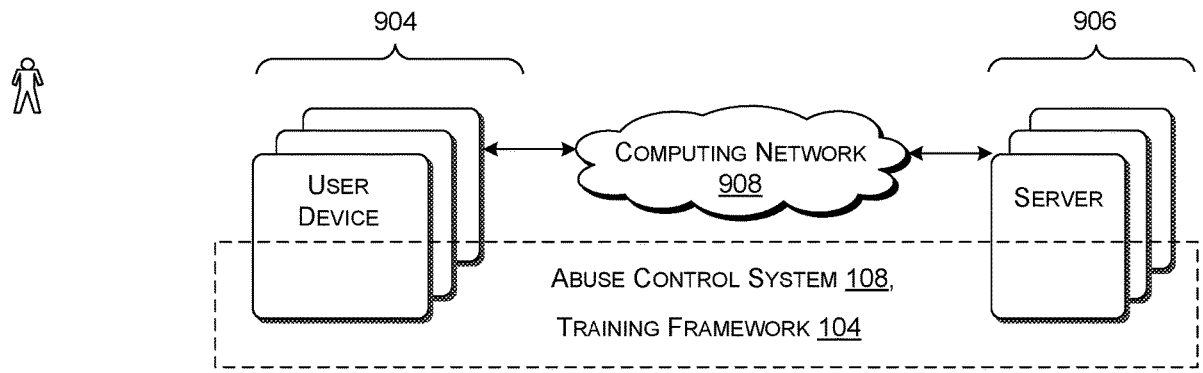
FIG. 9 shows illustrative computing equipment that is capable of implementing the computing system of FIG. 1.

FIG. 9 shows an example of computing equipment 902 that, in some implementations, is used to implement aspects of the training framework 104 and/or the abuse control system 108. The computing equipment 902 includes a set of user devices 904 coupled to a set of servers 906 via a computing network 908. Each user device corresponds to any type of computing device, including any of a desktop computing device, a laptop computing device, a handheld computing device of any type (e.g., a smartphone or a tablet-type computing device), a mixed reality device, a wearable computing device, an Internet-of-Things (IoT) device, a gaming system, a media device, a vehicle-borne computing system, any type of robot computing system, a computing system in a manufacturing system, etc. In some implementations, the computing network 908 is implemented as a local area network, a wide area network (e.g., the Internet), one or more point-to-point links, or any combination thereof.

The dashed-line box in FIG. 9 indicates that the functionality of the training framework 104 and the abuse control system 108 is capable of being spread across the user devices 904 and/or the servers 906 in any manner. For instance, in some cases, each user device with which a user interacts implements a local version of the abuse control system 108. Here, the servers 906 do not play any role in the operation of the abuse control system 108, other than downloading the trained GNN 106, which may be trained by the training framework 104 running on the servers 906. In other implementations, one or more of the servers 906 implement the entirety of the abuse control system 108. In other cases, the functionality associated with the abuse control system 108 is distributed between the servers 906 and each user device in any manner. Likewise, the components of the training framework 104 can be distributed between the user devices 904 and the servers 906 in various ways.

Figure 10:
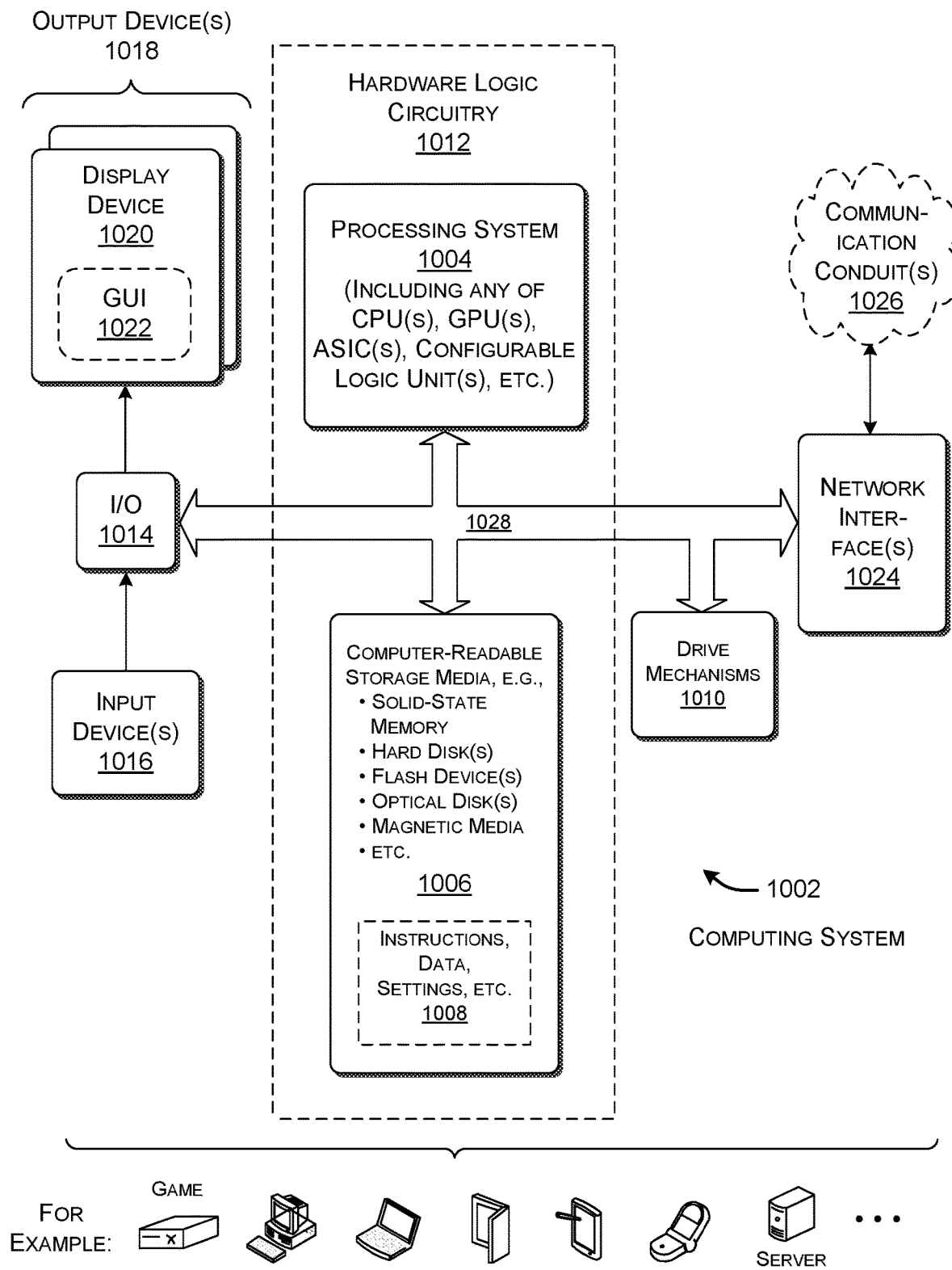
FIG. 10 shows an illustrative type of computing system that, in some implementations, is used to implement any aspect of the features shown in the foregoing drawings.

FIG. 10 shows a computing system 1002 that, in some implementations, is used to implement any aspect of the mechanisms set forth in the above-described figures. For instance, in some implementations, the type of computing system 1002 shown in FIG. 10 is used to implement any user computing device or any server shown in FIG. 9. In all cases, the computing system 1002 represents a physical and tangible processing mechanism.

The computing system 1002 includes a processing system 1004 including one or more processors. The processor(s) include one or more Central Processing Units (CPUs), and/or one or more Graphics Processing Units (GPUs), and/or one or more Application Specific Integrated Circuits (ASICs), and/or one or more Neural Processing Units (NPUs), etc. More generally, any processor corresponds to a general-purpose processing unit or an application-specific processor unit.

The computing system 1002 also includes computer-readable storage media 1006, corresponding to one or more computer-readable media hardware units. The computer-readable storage media 1006 retains any kind of information 1008, such as machine-readable instructions, settings, and/or data. For example, in some implementations, the computer-readable storage media 1006 includes one or more solid-state devices, one or more magnetic hard disks, one or more optical disks, magnetic tape, etc. Any instance of the computer-readable storage media 1006 uses any technology for storing and retrieving information. Further, any instance of the computer-readable storage media 1006 represents a fixed or removable unit of the computing system 1002. Further, any instance of the computer-readable storage media 1006 provides volatile and/or non-volatile retention of information.

More generally, any of the storage resources described herein, or any combination of the storage resources, is to be regarded as a computer-readable medium. In many cases, a computer-readable medium represents some form of physical and tangible entity. The term computer-readable medium also encompasses propagated signals, e.g., transmitted or received via a physical conduit and/or air or other wireless medium. However, the specific term "computer-readable storage medium" or "storage device" expressly excludes propagated signals per se in transit, while including all other forms of computer-readable media.

The computing system 1002 utilizes any instance of the computer-readable storage media 1006 in different ways. For example, in some implementations, any instance of the computer-readable storage media 1006 represents a hardware memory unit (such as Random Access Memory (RAM)) for storing information during execution of a program by the computing system 1002, and/or a hardware storage unit (such as a hard disk) for retaining/archiving information on a more permanent basis. In the latter case, the computing system 1002 also includes one or more drive mechanisms 1010 (such as a hard drive mechanism) for storing and retrieving information from an instance of the computer-readable storage media 1006.

In some implementations, the computing system 1002 performs any of the functions described above when the processing system 1004 executes computer-readable instructions stored in any instance of the computer-readable storage media 1006. For instance, in some implementations, the computing system 1002 carries out computer-readable instructions to perform each block of the processes described in Section B. FIG. 10 generally indicates that hardware logic circuitry 1012 includes any combination of the processing system 1004 and the computer-readable storage media 1006.

In addition, or alternatively, the processing system 1004 includes one or more other configurable logic units that perform operations using a collection of logic gates. For instance, in some implementations, the processing system 1004 includes a fixed configuration of hardware logic gates, e.g., that are created and set at the time of manufacture, and thereafter unalterable. In addition, or alternatively, the processing system 1004 includes a collection of programmable hardware logic gates that are set to perform different application-specific tasks. The latter category of devices includes, including Programmable Array Logic Devices (PALs), Generic Array Logic Devices (GALs), Complex Programmable Logic Devices (CPLDs), Field-Programmable Gate Arrays (FPGAs), etc. In these implementations, the processing system 1004 effectively incorporates a storage device that stores computer-readable instructions, insofar as the configurable logic units are configured to execute the instructions and therefore embody or store these instructions.

In some cases (e.g., in the case in which the computing system 1002 represents a user computing device), the computing system 1002 also includes an input/output interface 1014 for receiving various inputs (via input devices 1016), and for providing various outputs (via output devices 1018). Illustrative input devices include a keyboard device, a mouse input device, a touchscreen input device, a digitizing pad, one or more static image cameras, one or more video cameras, one or more depth camera systems, one or more microphones, a voice recognition mechanism, any position-determining devices (e.g., GPS devices), any movement detection mechanisms (e.g., accelerometers and/or gyroscopes), etc. In some implementations, one particular output mechanism includes a display device 1020 and an associated graphical user interface presentation (GUI) 1022. The display device 1020 corresponds to a liquid crystal display device, a light-emitting diode display (LED) device, a cathode ray tube device, a projection mechanism, etc. Other output devices include a printer, one or more speakers, a haptic output mechanism, an archival mechanism (for storing output information), etc. In some implementations, the computing system 1002 also includes one or more network interfaces 1024 for exchanging data with other devices via one or more communication conduits 1026. One or more communication buses 1028 communicatively couple the above-described units together.

The communication conduit(s) 1026 is capable of being be implemented in any manner, e.g., by a local area computing network, a wide area computing network (e.g., the Internet), point-to-point connections, or any combination thereof. The communication conduit(s) 1026 includes any combination of hardwired links, wireless links, routers, gateway functionality, name servers, etc., governed by any protocol or combination of protocols.

FIG. 10 shows the computing system 1002 as being composed of a discrete collection of separate units. In some cases, the collection of units corresponds to discrete hardware units provided in a computing device chassis having any form factor. FIG. 10 shows illustrative form factors in its bottom portion. In other cases, the computing system 1002 includes a hardware logic unit that integrates the functions of two or more of the units shown in FIG. 1. For instance, in some implementations, the computing system 1002 includes a system on a chip (SoC or SOC), corresponding to an integrated circuit that combines the functions of two or more of the units shown in FIG. 10.

The following summary provides a set of illustrative examples of the technology set forth herein.

(A1) According to a first aspect, a method (e.g., 602) is described for training a graph neural network (e.g., 106) for use in controlling interaction with a computing network (e.g., 110). The method includes: identifying (e.g., 604) a plurality of entities that interact with the computing network, each of which is determined to exhibit a prescribed amount of network activity; associating (e.g., 606) respective nodes with the entities; identifying (e.g., 608) respective feature sets for the plurality of entities, each feature set including features that describe network activity exhibited by an associated entity; identifying (e.g., 610) a plurality of edges, each edge in the plurality of edges connecting two entities in the plurality of entities having feature sets that satisfy a prescribed test for similarity; and labeling (e.g., 612) at least some of the entities with labels, each label indicating whether a corresponding entity is a kind of entity that engages in abusive network-related activity in collaboration with other entities that also engage in the abusive network-related activity, with respect to a given standard that defines what constitutes abusive network-related activity. The nodes, edges, and labels define a training set (e.g., 112). The method further includes: training (e.g., 614) the graph neural network based on the training set, to provide a trained graph neural network (e.g., 106); and configuring (e.g., 616) an abuse control system (e.g., 108) using the trained graph neural network to detect and act on abusive network-related activity in the computing network.

(A2) According to some implementations of the method of A1, each of the entities is associated with any combination of: a particular device identifier; and/or a particular network address identifier; and/or a particular network cookie.

(A3) According to some implementations of any one of the methods of A1 or A2, the trained neural network is configured to detect abusive network-related activity with respect to different ways of defining the entities.

(A4) According to some implementations of any one of the methods of A1-A3, a particular feature set associated with a particular entity describes characteristics of engagement by the particular entity with content that is deliverable over the computing network via websites hosted by the computing network.

(A5) According to some implementations of the method of A4, the content corresponds to advertisements that are deliverable over the computing network by websites hosted by respective publishers.

(A6) According to some implementations of any one of the methods of A1-A5, a particular feature set associated with a particular entity includes at least some features that describe characteristics of selections made by the particular entity.

(A7) According to some implementations of any one of the methods of A1-A6, a particular feature set associated with a particular entity includes at least some features that describe characteristics of query-related behavior of the particular entity preceding selections made by the particular entity.

(A8) According to some implementations of any one of the methods of A1-A7, a particular feature set associated with a first entity includes at least some features that describe a distribution of network activity by the first entity, with respect to a particular category of activity.

(A9) According to some implementations of the method of A8, the distribution of activity describes selections by the first entity of content hosted by different respective websites.

(A10) According to some implementations of any of the methods of A8 or A9, the distribution of activity also describes a timing at which the particular entity has made selections, with respect to different respective spans of time.

(A11) According to some implementations of any one of the methods of A8-A10, a particular pair of entities includes the first entity and a second entity, and wherein the first entity is determined to be connected to the second entity when features that describe the distribution of network activity by the first entity and features that describe a distribution of network activity by the second entity satisfy the prescribed test for similarity.

(A12) According to some implementations of any one of the methods of A1-A10, a particular pair of entities includes a first entity associated with a first feature set that is expressed as a first vector and a second entity associated with a second feature set that is expressed as a second vector, and wherein the particular pair of entities are determined to be connected by an edge when a distance between the first and second vectors satisfies the prescribed test for similarity.

(A13) According to some implementations of any one of the methods of A1-A12, a particular entity that engages in the abusive network-related activity is associated with a bot that is configured to enlist a plurality of entities, including the particular entity, to engage in the abusive network-related activity.

(A14) According to some implementations of any one of the methods of A1-A13, the abuse control system is configured to: identify a particular feature set associated with a particular entity under consideration having an unknown abuse classification; use the graph neural network to generate a result that indicates whether the particular entity is the kind of entity that engages in the abusive network-related activity; and take action to control interaction by the particular entity with the computing network based on the result generated by the graph neural network.

(B1) According to a second aspect, a method (e.g., 802) is described for controlling network activity. The method includes: identifying (e.g., 804) a particular feature set associated with a particular entity under consideration having an unknown classification, the feature set including features that describe the network activity of the particular entity over a computing network (e.g., 110); using (e.g., 806) a graph neural network (e.g., 106) to generate a result that indicates whether the particular entity is a kind of entity that engages in abusive network-related activity in collaboration with other network entities that also engage in the abusive network-related activity, with respect to a predetermined standard that defines what constitutes abusive network-related activity; and taking action (e.g., 808) to control interaction by the particular entity with the computing network based on the result generated by the graph neural network. The graph neural network is trained by a training framework (e.g., 104) by: associating (e.g., 606) respective nodes with the plurality of entities; identifying (608) respective feature sets for the plurality of entities, each feature set including features that describe network activity exhibited by an associated entity; identifying a plurality of edges, each edge in the plurality of edges connecting two entities in the plurality of entities having feature sets that satisfy a prescribed test for similarity; labeling (e.g., 612) at least some of the entities with labels, each label indicating whether a corresponding entity is the kind of entity that engages in the abusive network-related activity, the nodes, edges, and labels defining a training set (e.g., 112); and training (e.g., 614) the graph neural network based on the training set.

(C1) According to a third aspect, another method (e.g., 802) is described for training a graph neural network (e.g., 106). The method includes: associating (e.g., 606) respective nodes with the entities that engage in network activity over a computing network (e.g., 110); identifying (e.g., 608) respective feature sets for the plurality of entities, each feature set including features describing characteristics of engagement by a particular entity with content that is deliverable over the computing network via websites hosted by the computing network; identifying (e.g., 610) a plurality of edges, each edge in the plurality of edges connecting two entities in the plurality of entities having feature sets that satisfy a prescribed test for similarity; labeling (e.g., 612) at least some of the entities with labels, each label indicating whether a corresponding entity is a bot that engages in collaborative activity over the computing network with other bots, the nodes, edges, and labels defining a training set; and training (e.g., 614) the graph neural network based on the training set, to provide a trained graph neural network (e.g., 106) for use by an abuse control system (e.g., 108).

In yet another aspect, some implementations of the technology described herein include a computing system (e.g., the computing system 1002) that includes a processing system (e.g., the processing system 1004) having a processor. The computing system also includes a storage device (e.g., the computer-readable storage media 1006) for storing computer-readable instructions (e.g., information 1008) that, when executed by the processing system, perform any of the methods described herein (e.g., any one of the methods of A1-A14, B1, or C1).

In yet another aspect, some implementations of the technology described herein include a computer-readable storage medium (e.g., the computer-readable storage media 1006) for storing computer-readable instructions (e.g., the information 1008). A processing system (e.g., the processing system 1004) executes the computer-readable instructions to perform any of the operations described herein (e.g., the operation in any one of the methods of A1-A14, B1, or C1).

More generally stated, any of the individual elements and steps described herein combinable, for example, into any logically consistent permutation or subset. Further, any such combination is capable of being be manifested as a method, device, system, computer-readable storage medium, data structure, article of manufacture, graphical user interface presentation, etc. The technology is also expressible as a series of means-plus-format elements in the claims, although this format should not be considered to be invoked unless the phase "means for" is explicitly used in the claims.

As to terminology used in this description, the phrase "configured to" encompasses various physical and tangible mechanisms for performing an identified operation. The mechanisms are configurable to perform an operation using the hardware logic circuitry 1012 of Section C. The term "logic" likewise encompasses various physical and tangible mechanisms for performing a task. For instance, each processing-related operation illustrated in the flowcharts of Section B corresponds to a logic component for performing that operation.

This description may have identified one or more features as "optional." This type of statement is not to be interpreted as an exhaustive indication of features that are to be considered optional; generally, any feature is to be considered as optional, although not explicitly identified in the text, unless otherwise noted. Further, any mention of a single entity is not intended to preclude the use of plural such entities; similarly, a description of plural entities in the specification is not intended to preclude the use of a single entity. As such, a statement that an apparatus or method has a feature X does not preclude the possibility that it has additional features. Further, any features described as alternative ways of carrying out identified functions or implementing identified mechanisms are also combinable together in any combination, unless otherwise noted. Further, the term "plurality" or "plural" or the plural form of any term (without explicit use of "plurality" or "plural") refers to two or more items, and does not necessarily imply "all" items of a particular kind, unless otherwise explicitly specified. The term "at least one of" refers to one or more items; reference to a single item, without explicit recitation of "at least one of," is not intended to preclude the inclusion of plural items, unless otherwise noted. Further, the descriptors "first," "second," "third," etc. are used to distinguish among different items, and do not imply an ordering among items, unless otherwise noted. The phrase "A and/or B" means A, or B, or A and B. Further, the terms "comprising," "including," and "having" are open-ended terms that are used to identify at least one part of a larger whole, but not necessarily all parts of the whole. A "set" includes zero members, one member, or more than one member. Finally, the terms "exemplary" or "illustrative" refer to one implementation among potentially many implementations.

In closing, the functionality described herein is capable of employing various mechanisms to ensure that any user data is handled in a manner that conforms to applicable laws, social norms, and the expectations and preferences of individual users. For example, the functionality is configurable to allow a user to expressly opt in to (and then expressly opt out of) the provisions of the functionality. The functionality is also configurable to provide suitable security mechanisms to ensure the privacy of the user data (such as data-sanitizing mechanisms, encryption mechanisms, and/or password-protection mechanisms).

Further, the description may have set forth various concepts in the context of illustrative challenges or problems. This manner of explanation is not intended to suggest that others have appreciated and/or articulated the challenges or problems in the manner specified herein. Further, this manner of explanation is not intended to suggest that the subject matter recited in the claims is limited to solving the identified challenges or problems; that is, the subject matter in the claims may be applied in the context of challenges or problems other than those described herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method for training a graph neural network for use in controlling interaction with a computing network, comprising:
    identifying a plurality of entities that interact with the computing network, each of which is determined to exhibit a prescribed amount of network activity;
    associating respective nodes with the entities;
    identifying respective feature sets for the plurality of entities, each feature set including features that describe network activity exhibited by an associated entity;
    identifying a plurality of edges, each edge in the plurality of edges connecting two entities in the plurality of entities having feature sets that satisfy a prescribed test for similarity;
    labeling at least some of the entities with labels, each label indicating whether a corresponding entity is a kind of entity that engages in abusive network-related activity in collaboration with other entities that also engage in the abusive network-related activity, with respect to a given standard that defines what constitutes abusive network-related activity,
    the nodes, edges, and labels defining a training set;
    training the graph neural network based on the training set, to provide a trained graph neural network; and
    configuring an abuse control system using the trained graph neural network to detect and act on abusive network-related activity in the computing network.

2. The method of claim 1, wherein a particular feature set associated with a particular entity describes characteristics of engagement by the particular entity with content that is deliverable over the computing network via websites hosted by the computing network.

3. The method of claim 2, wherein the content corresponds to advertisements that are deliverable over the computing network by websites hosted by respective publishers.

4. The method of claim 1, wherein a particular feature set associated with a first entity includes at least some features that describe a distribution of network activity by the first entity, with respect to a particular category of activity.

5. The method of claim 4, wherein the distribution of activity describes selections by the first entity of content hosted by different respective websites.

6. The method of claim 4, wherein the distribution of activity describes a timing at which the particular entity has made selections, with respect to different respective spans of time.

7. The method of claim 4, wherein a particular pair of entities includes the first entity and a second entity, and wherein the first entity is determined to be connected to the second entity when features that describe the distribution of network activity by the first entity and features that describe a distribution of network activity by the second entity satisfy the prescribed test for similarity.

8. The method of claim 1, wherein each of the entities is associated with any combination of:
    a particular device identifier; and/or
    a particular network address identifier; and/or
    a particular network cookie.

9. The method of claim 1, wherein the trained neural network is configured to detect abusive network-related activity with respect to different ways of defining the entities.

10. The method of claim 1, wherein a particular feature set associated with a particular entity includes at least some features that describe characteristics of selections made by the particular entity.

11. The method of claim 1, wherein a particular feature set associated with a particular entity includes at least some features that describe characteristics of query-related behavior of the particular entity preceding selections made by the particular entity.

12. The method of claim 1, wherein a particular pair of entities includes a first entity associated with a first feature set that is expressed as a first vector and a second entity associated with a second feature set that is expressed as a second vector, and wherein the particular pair of entities are determined to be connected by an edge when a distance between the first and second vectors satisfies the prescribed test for similarity.

13. The method of claim 1, wherein a particular entity that engages in the abusive network-related activity is associated with a bot that is configured to enlist a plurality of entities, including the particular entity, to engage in the abusive network-related activity.

14. The method of claim 1, wherein the abuse control system is configured to: identify a particular feature set associated with a particular entity under consideration having an unknown abuse classification; use the graph neural network to generate a result that indicates whether the particular entity is the kind of entity that engages in the abusive network-related activity; and take action to control interaction by the particular entity with the computing network based on the result generated by the graph neural network.

15. A computing system for controlling network activity, comprising:
a processing system including a processor;
a network-inspecting mechanism for detecting network activity by a plurality of entities over a computing network;
a storage device for storing machine-readable instructions that, when executed by the processing system, perform operations comprising:
identifying a particular feature set associated with a particular entity under consideration having an unknown classification, the feature set including features that describe the network activity of the particular entity over the computing network;
using a graph neural network to generate a result that indicates whether the particular entity is a kind of entity that engages in abusive network-related activity in collaboration with other network entities that also engage in the abusive network-related activity, with respect to a predetermined standard that defines what constitutes abusive network-related activity; and
taking action to control interaction by the particular entity with the computing network based on the result generated by the graph neural network,
the graph neural network being trained by a training framework by:
associating respective nodes with the plurality of entities;
identifying respective feature sets for the plurality of entities, each feature set including features that describe network activity exhibited by an associated entity;
identifying a plurality of edges, each edge in the plurality of edges connecting two entities in the plurality of entities having feature sets that satisfy a prescribed test for similarity;
labeling at least some of the entities with labels, each label indicating whether a corresponding entity is the kind of entity that engages in the abusive network-related activity,
the nodes, edges, and labels defining a training set; and
training the graph neural network based on the training set.

16. The computing system of claim 15, wherein the entities that are associated with nodes are entities that are determined to exhibit a prescribed amount of the network activity.

17. The computing system of claim 15, wherein a given feature set associated with a given entity describes characteristics of engagement by the given entity with content that is deliverable over the computing network via websites hosted by the computing network.

18. The computing of claim 15, wherein a given entity that engages in the abusive network-related activity is associated with a bot that is configured to enlist a plurality of entities, including the given entity, to engage in the abusive network-related activity.

19. A computer-readable storage medium for storing computer-readable instructions, wherein a processing system executing the computer-readable instructions performs operations comprising:
associating respective nodes with the entities that engage in network activity over a computing network;
identifying respective feature sets for the plurality of entities, each feature set including features describing characteristics of engagement by a particular entity with content that is deliverable over the computing network via websites hosted by the computing network;
identifying a plurality of edges, each edge in the plurality of edges connecting two entities in the plurality of entities having feature sets that satisfy a prescribed test for similarity;
labeling at least some of the entities with labels, each label indicating whether a corresponding entity is a bot that engages in collaborative activity over the computing network with other bots,
the nodes, edges, and labels defining a training set;
training the graph neural network based on the training set, to provide a trained graph neural network for use by an abuse control system.

20. The computer-readable storage medium of claim 19, wherein a particular pair of entities includes the first entity and a second entity, and wherein the first entity is determined to be connected to the second entity when features that describe the distribution of network activity by the first entity and features that describe a distribution of network activity the second entity satisfy the prescribed test for similarity.

* * * * *